United States Patent [19]

Corbi

[11] 4,275,292
[45] Jun. 23, 1981

[54] METHOD AND APPARATUS FOR POSITIONING A DRAG RACING VEHICLE TO A STARTING-LINE POSITION

[76] Inventor: Ronald W. Corbi, 368 Edgewood Dr., Columbiana, Ohio 44408

[21] Appl. No.: 21,725

[22] Filed: Mar. 19, 1979

[51] Int. Cl.³ .............................................. G06M 3/06
[52] U.S. Cl. ........................ 235/92 DN; 235/92 TC; 235/92 V; 340/23
[58] Field of Search ........ 235/92 DN, 92 TC, 92 FQ, 235/92 V; 340/23

[56] References Cited
U.S. PATENT DOCUMENTS

| | | | |
|---|---|---|---|
| 3,865,305 | 2/1975 | Sampey | 235/92 DN |
| 4,068,307 | 1/1978 | Floyd et al. | 235/92 DN |
| 4,103,332 | 7/1978 | Floyd et al. | 235/92 DN |
| 4,176,397 | 11/1979 | Crom et al. | 235/92 DN |

*Primary Examiner*—Joseph M. Thesz
*Attorney, Agent, or Firm*—Webster B. Harpman

[57] ABSTRACT

A method of and apparatus for positioning a drag racing vehicle is provided for the purpose of enabling the driver to position the drag racing vehicle to a preferred and predetermined starting-line position.

2 Claims, 6 Drawing Figures

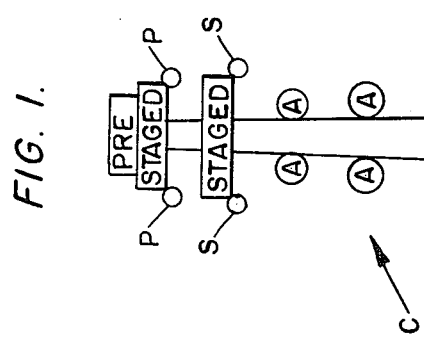

METHOD AND APPARATUS FOR POSITIONING A DRAG RACING VEHICLE TO A STARTING-LINE POSITION

BACKGROUND OF THE INVENTION

The present invention pertains to the highly competitive sport of drag racing including the type of competition referred to as "Bracket Racing," which is different from the National Hot Rod Association (NHRA) style of handicap racing, as discussed hereinafter.

In order to fully comprehend the numerous advantages of the present invention, it is necessary to define and describe the sport of drag racing and to discuss in detail the layout of the drag racing track and, more specifically, the electronic starting system utilized in drag racing to provide each competitor with the fairest start possible. The electronic systems employed for determining the drag racing vehicles' elapsed time, hereinafter referred to as "ET," and the top-end speed of the vehicle which is determined at or near the finish line, will also be discussed below.

Essentially, drag racing is a pairing of two vehicles against one another in a race through a quarter or eighth mile straightaway course. The drag racing strip or track consists of two racing lanes, one for each racing vehicle. The start of the race is the key to its uniqueness, in that all races are started from a standstill.

The present day electronic starting system is a product of continued development, designed to provide each competitor with the fairest start possible. Replacing the human element, the "flagman" which served the sport in its infancy, today's standardized electronic starting system is commonly referred to as the "Christmas Tree." This system features a vertical series of lights, displaying a visual countdown for each driver. It is located on the center line of the drag racing track, between the two racing lanes, approximately twenty feet downcourse from the "starting-line." The "Christmas Tree" is also equipped with lights utilized to indicate when each racing vehicle is "pre-staged" and properly "staged" and ready for competition, which will be more fully explained below. The starting system is activated by a designated official Starter, using a hand-held device, when both of the racing vehicles are properly "staged."

In the Sportsman/handicap racing categories, the racing cars are started with a full five amber light "Christmas Tree," allowing two and one half seconds to elapse from the start of the countdown until the light flashes green, thereby indicating to the driver the starting time of the race. Professional/non-handicap categories use a single amber starting signal at all major NHRA events.

Most drivers try to make their "move" between the time that the last amber light is going "off" and the green light is coming "on." If a driver reacts too quickly, however, the electronic starting system will indicate on the "Christmas Tree" a red light foul start indication. In elimination racing, a foul start is an automatic loss and the driver is disqualified from the competition for the event.

The individual driver's technique in "staging" and starting is one of the most vital skills a drag racer can develop as a majority of races are won and lost at the "starting-line." This is particularly true in the case of "Bracket Racing" which represents a type of racing competition in the sport of drag racing, which will now be discussed.

"Bracket Racing" is drag racing with a slight twist or modification. The object of the race is to arrive at the finish line before your opponent does, without fouling, and by not running faster or quicker than your "index." The difference, though, between bracket racing and NHRA-style racing is that in the brackets, the competitor, and no one else, picks the "index." Since the competitor decides how fast his or her car should run, which determines the choice of an appropriate "index," the key to winning at the brackets, therefore, is consistency—consistency of the car's performance and the consistency of a driver's performance, particularly with respect to the driver's "staging" technique (prior to the start of the race), "starting-line" technique (at the time the race is started), and performance (at the finish line). Since the key winning determination factor in bracket racing is the car's ET (Elapsed Time), regardless of the speed of the car at the finish line, a discussion regarding the calculation of a racing car's ET now follows.

Contrary to popular belief, a racing car's ET and the green light indication on the "Christmas Tree," indicating to the driver the start of the race, have nothing to do with each other. In other words, a car's ET does not begin with the time at which the green light is turned "on." The ET begins when the driver and the racing vehicle "break" the "staging" light beam. This accepted nomenclature in the field of drag racing is deceiving in its description or reference to the "staging" light beam in that "breaking" the "staging" light beam technically means the "unblocking" of this light beam, by the front tire of the racing vehicle, so that the "staging" light beam photodetector device receives light from the "staging" light beam source, as further discussed in detail hereinafter.

Moreover, consistent reaction of the driver of any racing vehicle at the start of the race and the "starting-line" position or "staging" position of a drag racing vehicle (prior to the start of the race) most acceptably constitute the essential factors of winning the race no matter what type of drag racing competition is involved whether it be bracket racing or NHRA-style handicap racing or others.

Furthermore, the "staged" position of the racing vehicle at the starting-line is probably the most important aspect of a driver's starting technique in that each driver has different speed reflexes, or reacting times; people with slower reflexes can compensate for their slowness by trying to leave the starting-line sooner, knowing that it will take longer to actually get moving. A driver has to make several driving runs to find out the optimum time for leaving the starting-line, near or upon noting the green light "go" indication from the "Christmas Tree," whether it is just as the next or last amber light goes "on," goes "out" or as the last amber light comes "on." A driver's reaction time will probably be between one and three hundredths of a second and he or she must ascertain, accurately approximate, what the timing cycle of the red light is with respect to "staging" and the green light indication. Once each driver masters the beforementioned starting techniques, he or she must endeavor to position the drag racing vehicle at a particularly preferred and predetermined "staging" position in that the driver's reacting time normally is substantially consistent race to race. This before-mentioned procedure is generally called "cutting a good light" and the object, therefore, is to start the ET clock ticking or counting as close to the red light trigger indication as possible, without actually "tripping the switch" which means "breaking" the "staging" light beam prior to green light "go" indication. Consistently getting the ET clock started just a hairs breadth away from a red light foul indication, herein referred to as "cutting a good light" is, for example, in bracket racing, the single most important aspect thereof.

Races are constantly won by as few as hundredths of a second and even frequently by thousandths of a second. With such an exacting winning context, one would expect that a great deal of standardization would exist in the sport of drag racing with respect to the "rollout distance" at the "starting-line" area of each and every drag racing track. However, this is not true and, in fact, the "rollout distance" varies greatly. In this regard, a discussion now follows with respect to the "rollout distance."

The "rollout distance" has been described as being that distance the front tire of a drag racing vehicle travels from the point at which its leading edge first interrupts or blocks the "pre-staging" light beam to the point at which the trailing edge of the front tire passes through and "makes" the "staging" light beam.

Furthermore, the "rollout distance" has been more accurately defined as the distance the front tire of a drag racing vehicle travels from the point at which its leading edge first interrupts or blocks the "staging" light beam until, or to the point at which, its trailing edge passes through and "makes" or unblocks the "staging" light beam. With regard to this latter definition, the "rollout distance" particularly varies, for each driver with respect to the size of the front tire of the drag racing vehicle, i.e., the diameter and profile including circumference thereof. Essentially though, the "rollout distance" is the distance the front tire of a racing vehicle travels from a "staged" position to the point at which a red light indication can occur. Further explanation with respect to the techniques of "shallow staging" and "deep staging" will be presented hereinbelow.

Accordingly, with regard to the above and with reference to the situation concerning the non-standardization of some of the essential elements of the electronic starting system employed and utilized at drag racing tracks across the country, the following is presented.

The primary elements of the electronic starting system, which are mounted at track or ground level, are: (1) the "pre-staging" and "staging" light beam sources and their respective photodetector devices (one set for each racing lane, and (2) the "Christmas Tree." Each racing track, as far as can be ascertained, installs and maintains these beforementioned devices. Moreover, particularly with respect to the light beam sources and respective photodetectors, it is common knowledge that there exists no requirement or standard governing the exact and uniform installation of these devices on each drag racing strip with the possible exception of the "Christmas Tree" device, as discussed below. More specifically, no installation requirement exists for the following:

1. the height at which the "pre-staging" and "staging" light beam sources are mounted above the track or ground level;

2. the distance between the mounting positions of the "pre-staging" and "staging" light beam sources; and 3. the intensity of each of the light beam sources, and particularly, the "staged" light beam source is not maintained to, or kept at, a specific or constant level.

It is, therefore, evident that, firstly, the "rollout distance" described above at each drag racing track is not uniform and, in fact, varies greatly. For example, the "rollout distance" may vary from a distance, at one racing track, of 8 to 9 inches up to as much as a distance of 14 to 16 inches, at another racing track. Secondly, it is evident that such a situation creates an additional burden on each driver which accordingly amplifies the difficulty he or she is confronted with in positioning the racing vehicle to a preferred and predetermined "starting-line" position.

Furthermore, the "starting-line" of a drag racing track or strip is not marked in such a way as to be visually perceivable to the driver of a drag racing vehicle. In fact, it is generally known that no "starting-line" marking(s) appear on the racing surface of a drag racing track in that such a marking would be continually erased, altered or removed by the driven, traction tires of a drag racing vehicle each time a race is started. Accordingly, it is generally accepted knowledge that the "starting-line" area is essentially that area defined by the path of the "staging" light beam, as projected from its source across the racing lane to the staging light beam photodetector device.

Moreover, the "staging" light beam is not a finite, visually perceptible beam of light, nor is it a narrow, high intensity light beam such as that generated from a laser source. The nature of the "staging" light beam, more accurately defined as a broad or wide beam of light, therefore, further complicates the driver's task of placing a racing vehicle in a preferred starting-line position.

In this regard, a further degree of possible error exists with respect to the exact position of a racing vehicle at the "starting-line" and the driver's perceived starting-line position of the drag racing vehicle.

It is, therefore, in view of the above description, the purpose of the present invention to provide a method of and apparatus for positioning a drag racing vehicle which enables the driver of such a vehicle to accurately position the drag racing vehicle to a preferred and predetermined "starting-line" position.

SUMMARY OF THE INVENTION

In accordance with the purpose of the present invention, a method and apparatus are provided for enabling the driver of any type of drag racing vehicle to accurately position the drag racing vehicle in or to a preferred and predetermined "starting-line" or "staged" position, prior to the start of a race.

It is a primary object of the instant invention to greatly reduce the degree of human error that exists with respect to the exact "staging" position of a drag racing vehicle and the driver's perceived "staging" position of that racing vehicle.

It is a further object of the present invention to allow the driver of a drag racing vehicle to more easily and accurately position such a vehicle in a desired or preferable "staging" position, prior to the start of a race, which substantially increases his or her percentage of winning the race and the resultant competition.

It is another object of the present invention to provide a method of positioning a drag racing vehicle to a preferred and predetermined "starting-line" or "staged" position, which method comprises:

(a) determining a preferred "staged" position;

(b) moving a drag racing vehicle to a first or initial position at or near the starting-line of the drag racing track;

(c) determining the distance travelled by the drag racing vehicle when such vehicle is moved from the first or initial position to the preferred or predetermined "staged" position; and (d) visually displaying, to the driver of the racing vehicle, the determined travelled distance.

It is still another object of the present invention to provide other methods which include slight variations of the aforementioned method, which will be presented after the following discussion.

A predetermined time restriction is levied on the driver of a drag racing vehicle which restricts the amount of time available to position the racing vehicle to a "staged" position. The drive normally has a short period of time, such as 15 or 30 seconds, within which to place or position the racing vehicle in a "staged" position, which time period commences with the "pre-staging" light indication on the "Christmas Tree." Therefore, the present invention provides the following method of determining, prior to the start of the race and normally performed at or during a practice run or some other appropriate time, the distance travelled by the racing vehicle from a first position (at or near the starting-line) to a preferred "staging" position:

(a) positioning a drag racing vehicle to a first position at or near the starting-line of the drag racing track;

(b) moving a drag racing vehicle from the first position to a preferred "staging" position and determining the distance travelled therebetween by the racing vehicle; and (c) visually displaying, to the driver of the racing vehicle, the determined travelled distance between the initial position and the preferred "staging" position.

It is, therefore, still another object of the present invention to provide to the driver of a drag racing vehicle an accurate and visually displayed representation of the total distance necessary to move a racing vehicle from an initial position to a preferred "staging" position (prior to the start of each race), which allows or enables the driver to position the drag racing vehicle to a consistently exact "staging" position which may be accomplished in accordance with the instant invention in the following manner:

(a) positioning a drag racing vehicle to a determined first position at or near the starting-line of the drag racing track, and upon arriving at the determined first position, (b) commencing the operation of a distance determining device attached to and operated in accordance with the travel of the drag racing vehicle, and (c) moving the drag racing vehicle forward until the same predetermined travelled distance is visually displayed to the driver and thereupon stopping the drag racing vehicle which results in positioning it in the determined preferable "staging" position.

It is yet another object of the present invention to provide both a method of and apparatus for positioning a drag racing vehicle to a forwardmost "staged" position.

It is still yet another object of the present invention to provide a device for determining the distance travelled by a drag racing vehicle from a predetermined or designated initial position to a preferred "staging" position, which device visually displays, to the driver of the racing vehicle, an accurate representation of the determined travelled distance.

In accordance with these and other objects of the present invention which will be apparent hereinafter, the present invention will now be described with particular reference to the accompanying drawings.

BRIEF DESCRIPTION OF THE DRAWINGS

The invention will now be described by way of example with reference to the accompanying drawings in which:

FIG. 1 shows a simplified representation of a "Christmas Tree" starting-line indicator device utilized at a drag racing strip.

FIG. 2 shows a top plan view illustrating a first position of the front tire of a drag racing vehicle wherein the "pre-staging" light beam is blocked by the forward or leading edge of the tire, a second position of the front tire of a drag racing vehicle wherein the "staging" light beam is blocked by the rear or trailing edge of the tire and a third position of the front tire wherein the trailing edge of the tire does not block the "staging" light beam.

FIG. 3 includes FIG 3A and FIG. 3B which respectively illustrate a side view of a "deep stage" and a "shallow stage" position of the front tire of a drag racing vehicle with respect to the "pre-staging" light beam 1' and the "staging" light beam 3'.

DETAILED DESCRIPTION OF THE INVENTION

Figure 4:
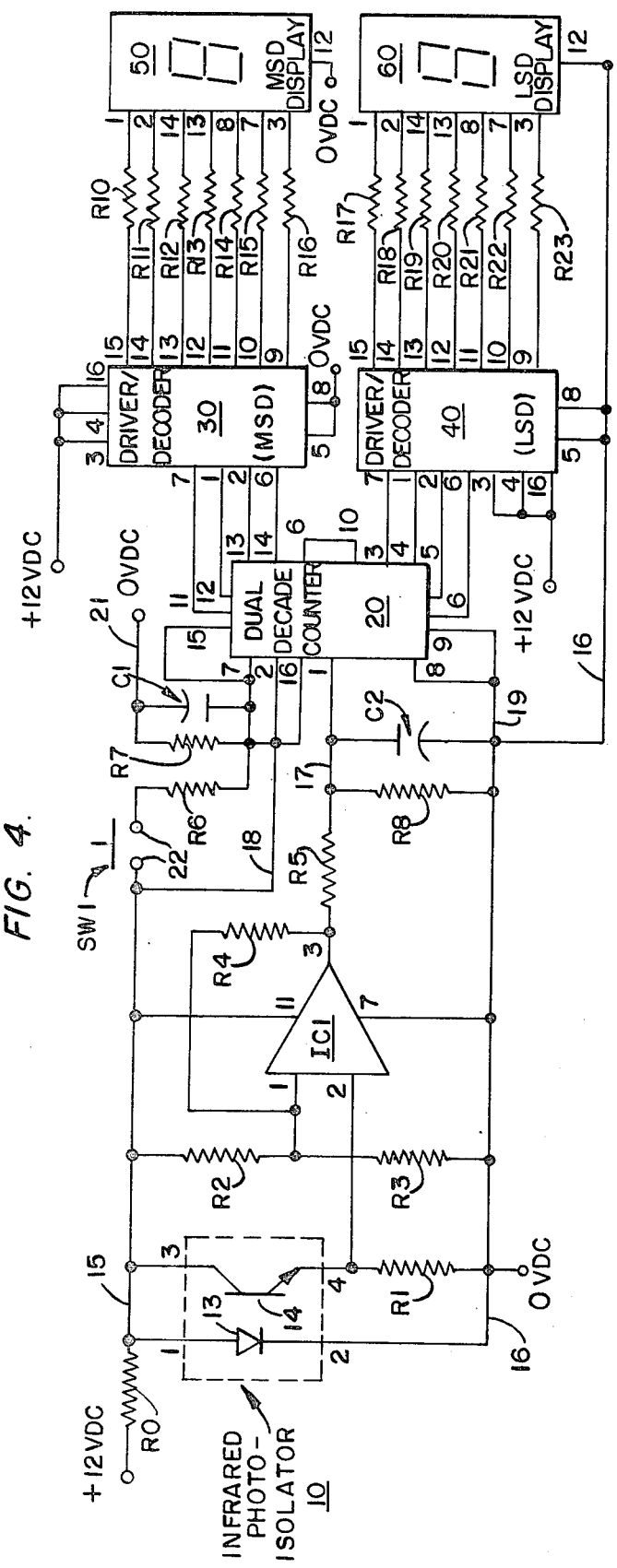
FIG. 4 shows a circuit diagram of a preferred embodiment of the present invention.

FIG. 1 shows a simplified representation of a "Christmas Tree" device C, previously described above, which provides two vertical series of lights, one series for each racing competitor. Only one series of lights will now be described, for the sake of brevity. The device C provides a "pre-staged" light P, a "staged" light S, five amber lights A, a green light G and a red (foul indication) light R.

FIG. 2 shows a simplified top plan view of one racing lane illustrating the projected paths of the "pre-staging" and "staging" light beams, which are projected from their respective sources 1 and 3 across the racing lane to their respective photodetector devices 2 and 4. Further shown in FIG. 2 are pictorial exemplary views of three relative positions of a front tire W of a drag racing vehicle. On the righthand side of FIG. 2, a first position of a front tire W is shown wherein the forward or leading edge f of the tire is blocking or interrupting the path of the "pre-staging" light beam from photodetector 2. When this occurs, the "pre-staged" light P on the "Christmas Tree" C is accordingly automatically turned "on," thereby indicating this condition to the driver. In fact, as long as any portion of tire W blocks the "pre-staging" light beam, the "pre-staging" light is constantly energized. As the driver of the racing vehicle moves the vehicle forward (to the left as indicated by the arrow) the forward edge of the tire will eventually block the path of the "staging" light beam and the "staged" light S is accordingly automatically energized or turned "on," thereby indicating to the driver that the racing vehicle is properly "staged." When both of the competing racing vehicles are positioned at the starting-line such that their respective "staged" light S is "on," the designated official Starter then may activate the electronic starting system using a hand-held device.

The following discussion concerning various "staging" positions will now be presented with reference to FIGS. 2 and 3.

As stated above, as long as any portion of the front tire of a drag racing vehicle blocks the path of the "staging" light beam, the "staged" light S on the device C will be energized or lit and, therefore, numerous properly "staged" positions of a drag racing vehicle are possible. There is shown in FIG. 3 two exemplary and proper "staging" positions which are respectively shown in FIGS. 3A and 3B.

With regard to FIG. 3B, a "shallow staging" position is shown wherein a front tire of a racing vehicle is blocking both paths of the "pre-staging" and "staging" light beams projected from indicated sources 1' and 3', respectively.

A "deep staging" position is shown in FIG. 3A wherein a front tire of a racing vehicle is only blocking the path of the "staging" light beam and accordingly the "staged" light S is "on" and the respective "pre-staged" light P is "off." The tire position depicted in FIG. 3B may be referred to as the forwardmost properly "staged" position.

How a driver stages a drag racing vehicle directly affects "rollout," or the distance a front tire travels from the point its leading edge first interrupts the staging beam until the trailing edge thereof passes through and "makes" the beam again. In shallow staging, as shown in FIG. 3B, the front tire of the racing vehicle may actually move forward a distance of as much as 15 inches before the staging beam "makes", or is not blocked, depending upon tire diameter, beam height and other related parameters. Deep staging, as shown in FIG. 3A, normally reduces "rollout" and slows or lessens elapsed time.

It is generally accepted that the object in Bracket Racing, as well as in other types of drag racing competition, is to anticipate the green light on the "Christmas Tree" to the point where only the finest line separates the "ideal" reaction time from a red-light start, as mentioned herein. However, since the reaction time of each driver is different, a driver through experimentation and experience must endeavor to ascertain his or her preferred "staging" position in order to perfect their starting technique of "cutting a good light." For instance, a driver having a slow reaction time may endeavor to position the racing vehicle to a deep staging position, and accordingly, a driver having a quick reaction time may endeavor to attain a shallow staging position at the starting-line. Regardless, consistent "staging" and knowing "your" rollout will allow a driver to decide when to leave (make a "move" at the starting-line)—be it on the next to last amber light or the last one.

The apparatus of the present invention will now be described with reference to FIGS. 4 and 5.

Figure 5:
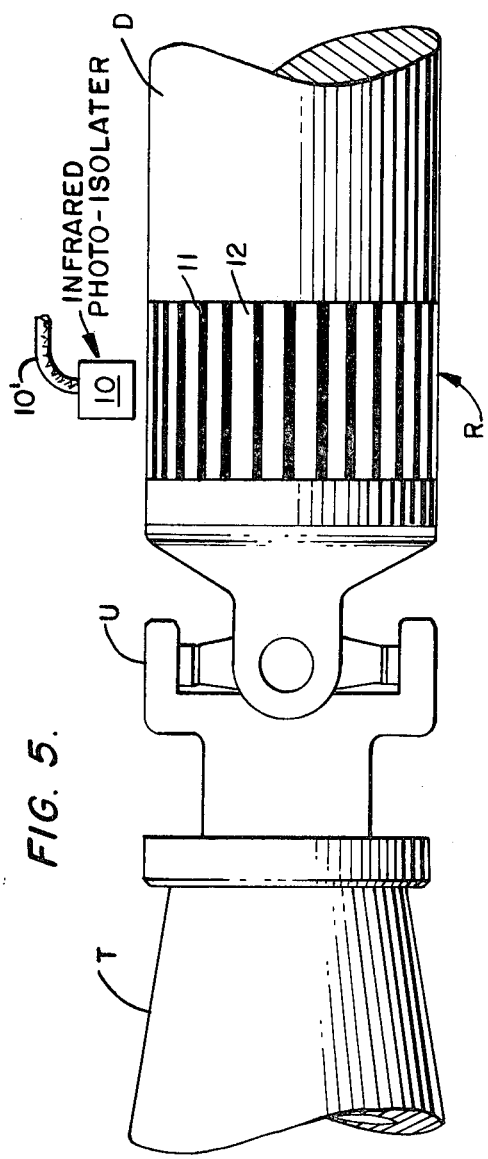
FIG. 5 shows a fragmentary plan view of the transmission tail shaft, the universal joint and the drive shaft of a drag racing vehicle and illustrates the mounting position of the infrared photo-isolator device 10 with respect to the device R attached to the drive shaft D.

There is shown in FIG. 5 a fragmentary plan view of a drive train of an exemplary drag racing vehicle comprising a transmission (tail shaft) T connected to drive, via universal joint U, a drive shaft D. Further shown therein is a photoresponsive device labeled R which is affixed to and encircles the periphery of drive shaft D, in any suitable manner such as, i.e., adhesively-attached thereto for the purpose of being rotated in conjunction with the rotational movement of drive shaft D. Device R substantially comprises a plurality of equally dimensioned, non-reflective (opaque) and reflective areas or strips 11 and 12, respectively. Also shown in this figure is an illustrative mounting position of an infrared photo-isolator device 10 with respect to, or in the proximity of, device R. The IR photo-isolator device 10 (which is essentially a reflective-type unit) may be attached to the underside of a drag racing vehicle in any suitable manner, and connected via a suitable cable 10' to the input of the circuitry shown in FIG. 4. The mounting positions or locations of device R and its associated IR photo-isolator 10 may vary with respect to different types of drag racing vehicles having various types of drive trains employed for either front engine or rear engine racing vehicles.

FIG. 4 shows a circuit diagram of a preferred embodiment of the apparatus of the instant invention, which circuitry is preferably housed and conveniently mounted, as a single unit, in the driver's compartment of a drag racing vehicle such as, i.e., on the dashboard thereof, so as to be easily accessible and viewable to the driver. The circuitry shown in FIG. 4 is powered by a self-contained battery power source (not shown).

With regard to IR photo-isolator 10, depicted generally in FIG. 5 and more specifically shown as connected in circuit to the input of the circuitry shown in FIG. 4, infrared diode 13 is constantly forward biased and, therefore, energized when power is supplied thereto. The application of power, from the aforementioned battery supply source or any other suitable source of power, to the circuit shown in FIG. 4 is controlled via a manually-actuated "on/off" power switch (not shown) which is available on the unit. The operation of component 10 in conjunction with device R will now be described as follows.

As device R is rotated with drive shaft D (upon forward movement of a drag racing vehicle) and when a reflective strip 12 is accordingly aligned to a detection position with respect to photo-isolator 10, a logic "one" high voltage level appears at pin 4 (phototransistor 14 energized "on"), shown as connected to the emitter of phototransistor 14; and when an opaque or non-reflective strip 11 is accordingly aligned to a detection position with respect to photo-isolator 10, a logic "zero" low voltage level appears at pin 4 (phototransistor 14 turned "off"). As shown in FIG. 4, infrared diode 13 is connected between the +12 VDC bus line 15 and the 0 vdc circuit line 16 via pins 1 and 2, respectively. The collector of phototransistor 14 is connected to bus line 15 via pin 3 and its emitter is connected, via pin 4, to the top of resistor R1 which is connected to circuit line 16. Resistor R0 is connected between the +12 VDC terminal and the junction of pin 1 (of component 10) and bus line 15 and functions as a current limiter. Bias or load resistor R1 functions to develop, at its junction with pin 4, the voltage which is applied to pin 2 of IC1. R2 and R3, connected in series with each other between circuit lines 15 and 16, comprise a voltage divider network which functions to develop, at the junction of R2 and R3, a reference voltage which is applied to pin 1 of IC1 via the depicted circuit line. R4 is a biasing resistor which is connected in series within an external feedback loop connected between output pin 3 and input pin 1 of operational amplifier IC1—configured and used as a voltage comparator. The voltage levels at which IC1 switches its output voltage level are set by the before-mentioned external feedback and biasing resistors. Pins 11 and 7 of IC1 are respectively connected to circuit lines 15 and 16.

A low-pass filter network comprising R5, R8 and C2 is connected between output pin 3 of IC1 and pin 1 of a Dual Decade (up) counter 20. More specifically, R5 is connected in series between pin 3 of IC1 and pin 1 of counter 20 via circuit line 17; and R8 and C2 are shown as being connected in parallel with each other between circuit lines 16 and 17.

As shown in FIG. 4, dual decade counter 20 is further connected in the circuit in the following manner: pins 2 and 16 are connected, via circuit line 18, to the +12 VDC bus line 15; pins 8 and 9 are connected, via circuit line 19, to the 0 vdc line 16; pin 15 connects to pin 7 which is connected to an external reset network comprising components SW1 (reset switch), R6, R7 and C1 (which will be further described hereinafter); the MSD (most significant digit) output pins 11, 12, 13 and 14 are respectively connected (via the depicted circuit lines) to input pins 7, 1, 2 and 6 of the MSD—Driver/Decoder device 30; pins 6 and 10 are connected to each other; and the LSD (least significant digit) output pins 3, 4, 5 and 6 are respectively connected (via the depicted circuit lines) to input pins 7, 1, 2 and 6 of the LSD—Driver/Decoder device 40.

The aforementioned external reset network is utilized to cause the internal counter circuit components of dual decade counter 20 to "reset" by applying a logic "one" voltage level to pin 7 thereof. This occurs when SW1 (push-button reset switch) is manually depressed, by the driver of the racing vehicle, thereby connecting the depicted switch terminals 22 which are shown as being connected between the +12 VDC bus line 15 and R6. Components R6, R7 and C1 comprise a low-pass filter which is connected as shown between the 0 vdc terminal and SW1 which includes switch terminals 22. When a logic "one" voltage level is applied to pin 7 of counter 20, the MSD and LSD indicator display devices 50 and 60 will, accordingly, via driver decoders 30 and 40, display "zeros."

The remaining circuit connections of components 30, 40, 50 and 60 will now be described as follows. With regard to components 30 and 40: pins 3, 4 and 16 of each decoder/driver are connected to the respectively depicted +12 VDC terminals shown in FIG. 4; pins 5 and 8 of LSD decoder/driver 40 are connected to 0 vdc line 16 and, accordingly, pins 5 and 8 of MSD decoder/driver 30 are connected to the depicted 0 vdc terminal; output pins 15, 14, 13, 12, 11, 10 and 9 of component 30 are connected respectively (via series-connected current-limiting resistors R10 to R16) to input pins 1, 2, 14, 13, 8, 7 and 3 of MSD display device 50; output pins 15, 14, 13, 12, 11, 10 and 9 of component 40 are connected respectively (via series-connected current-limiting resistors R17 to R23) to input pins 1, 2, 14, 13, 8, 7 and 3 of LSD display device 60; pin 12 of component 50 is connected to the depicted 0 vdc terminal; and, pin 12 of component 60 is connected to the 0 vdc circuit line 16. Indentification of the above-referenced components, including exemplary values thereof, are indicated in the following Table of Components:

| COMPONENT | VALUE | COMMENTS |
|---|---|---|
| R0 | 220 ohms | 10%, ¼ watt |
| R1, R5, R6 | 10K ohms | 10%, ¼ watt |
| R2, R3, R4, R7, R8 | 100K ohms | 10%, ¼ watt |
| R10 through R23 | 680 ohms | 10%, ¼ watt |
| C1, C2 | .1 ufd. | ceramic diffused, 25V, 20% |

| COMPONENT | MFGRS. DESIGNATED PART NO. |
|---|---|
| INFRARED PHOTO-ISOLATOR 10 | MCA7 |
| BCD DUAL DECADE COUNTER 20 | MC 1 4510 CP |
| DRIVER/DECODERS 30 and 40 | MC 1 4511 CP |
| L.E.D. DISPLAYS 50 and 60 | DL 702 |
| OP AMP IC1 | RC 4136 |

Although a preferred embodiment has been illustrated and described by way of example, it should be understood that the invention is not limited to the embodiment illustrated and many variations and modifications thereof are possible within the scope of the invention without departing from the spirit of the invention.

A simplified operational description of the apparatus of the present invention, shown in FIGS. 4 and 5, will now be presented.

The circuitry of the instant invention functions to provide an accurate and visually displayed representation of the total distance travelled by the drag racing vehicle from a determined first position to a preferred "staging" position at the starting-line of the racing lane. The circuitry of the invention has been designed or set up to count when an opaque or non-reflective strip 11 is accordingly aligned to a detection position with respect to photo-isolator 10 whereupon phototransistor 14 turns "off" and a logic "zero" low level of voltage appears at pin 4 thereof, which input pulse voltage is applied to pin 2 of IC1 configured and used as a voltage comparator to shape the input pulses applied thereto at pin 2. When this occurs, IC1 operates to provide at its output pin 3 a logic "one" high voltage level which is applied to pin 1 of dual decade counter 20, via the beforementioned low-pass filter network comprising R5, R8 and C2. Thus, ambient light will not cause any false triggering of the counting circuitry of the present invention.

When the voltage at pin 2 of IC1 exceeds 50% of the supply voltage, a logic "one" high level voltage appears at output pin 3 of IC1 and conversely, when the voltage at pin 2 decreases to one-third of the supply voltage, the op-amp IC1 operates to provide at pin 3 thereof a logic "zero" low voltage level. As explained above, the voltage levels at which IC1 switches are set by the external and biasing resistors associated therewith.

Dual decade counter 20 operates to count each logic "one" input pulse applied to its clock input pin 1. The "enable" pin 2 of counter 20 is connected to a logic "one" (+12 VDC) voltage level via circuit line 18 so that the counter increments on the leading edge of the clock pulse. Counter 20 operates to count and store, in a BCD (Binary Coded Digit) format, each input pulse supplied thereto at pin 1. The binary code of the count is available at the MSD output pins 11, 12, 13 and 14 and the LSD output pins 3, 4, 5 and 6 which are connected to their respective input pins of the MSD and LSD Decoder/Drivers 30 and 40, which then in turn decode their beforementioned inputs and drive the proper LED (light-emitting diode) display segments provided in the respectively connected display device so that the display reads out in a decimal numeric format. Thus, the amount or number of input pulses provided to the aforementioned circuit components via the IR photo-isolator 10 (upon detecting the plurality of opaque strips 11 which are rotated to a detection position in accordance with the rotational movement of the drive shaft of the racing vehicle) are, therefore, accordingly visually displayed on display devices 50 and 60 for the purpose of indicating to the driver of a drag racing vehicle an accurate representation of the distance travelled, by the vehicle, from a determined first position to a preferred and/or predetermined "staging" position.

In order to reset the circuitry of the present invention, the driver of a racing vehicle need only depress the switch SW1 which applies a logic "one" voltage level to reset terminal (pin 7) of counter 20 which erases the stored count and disables counter 20, thereby causing display devices 50 and 60 to display a numerical zero indication until the switch SW1 is released, which action thereby enables the counter to operate in accordance with the movement of a drag racing vehicle.

The internal operation of components IC1, Dual Decade Counter 20, Decoder/Drivers 30 and 40 and digital display devices 50 and 60 need not be described, in that these components and their respective internal circuitry and operation thereof are well known to one ordinarily skilled in the art.

The following description is presented for the purpose of further describing and illustrating the use of the present invention in accordance with the inventive disclosed methods thereof.

As stated above, the present invention is utilized to permit the driver of a racing vehicle to position it in a preferred and predetermined "staging" position. As discussed herein, the determination of the displayed numerical representation of the total distance necessary to move a racing vehicle from a predetermined initial position to a preferred "staging" position is normally determined by the driver at a time prior to the start of the racing competition, such as during a practice run or at any other available time, in view of the time restrictions levied on the driver to properly "stage" the racing vehicle prior to race time.

Since a preferred "staging" position varies with respect to each driver's preference depending upon his starting technique, the condition of the racing track and for many other reasons, only the following examples will be presented for the sake of brevity. Furthermore, each driver may choose to select various initial or first positions at or near the starting-line of the race track. Therefore, the following will be presented in accordance with an exemplary selection of an initial position herein designated to be the position attained by a drag racing vehicle at the time at which the "pre-staging" light located on the "Christmas Tree" C is initially "lit" or turned "on."

Firstly, if a driver wishes to position the drag racing vehicle in a forwardmost "staging" position, the following procedure or method is employed in conjunction with the present invention;

(a) positioning a drag racing vehicle to a position whereupon the "pre-staged" light, located on the "Christmas Tree," is initially turned "on" and upon such occurrence, (b) commencing the operation of the distance determining device of the present invention by actuating switch SW1, and (c) moving the drag racing vehicle forward to a position whereupon the "staged" light, located on the "Christmas Tree" is initially turned "on" and continuing to move the racing vehicle to a more forward position whereupon the "staged" light is extinguished or turned "off" and at that specific time noting the exact numerical representation displayed on the digital display.

The driver then would know the exact position at which the trailing edge of the front tire of the racing vehicle has unblocked the "staging" light beam and if, for example, the displayed number was "74," the driver would merely subtract one or two counts from this number and then know that a displayed number such as "73" or "72" would indicate a forwardmost properly "staged" position of the racing vehicle. Therefore, the driver would utilize this determined travelled distance during the course of staging the vehicle prior to a racing competition via the above-referenced procedure, with the exception that the driver would stop the vehicle at a stationary position at the specific time at which the number, i.e., "73" appears on the digital display device. A pictorial illustration of this procedure is found in FIG. 2 wherein: $D_1$ illustrates the distance travelled by a racing vehicle to a forwardmost "staged" position (numerically represented by the exemplary number "73"), and $D_2$ illustrates the distance travelled by a racing vehicle to a position (whereupon the "staging" light beam is unblocked by the trailing edge of the front tire—"staging" light turned "off") represented by the examplary number "74."

Numerous modifications of the above-described method of the invention are available to the driver of a drag racing vehicle, particularly with respect to ascertaining a preferred "staging" position other than that of a forwardmost position. For instance, the driver could be assisted by one of his or her racing crew members positioned at the staging area of the racing lane who could indicate to the driver when the racing vehicle attains a desired "staging" position, whereupon the driver would note the numerical representation displayed on the digital display device mounted in the driver's compartment of the vehicle.

Furthermore, and depending upon the experience and proficiency of a drag racing driver, the driver could visually ascertain the time at which he or she determines that the racing vehicle is positioned in a preferred "staging" position and thereupon noting the displayed number.

In summary, the present invention, as presented herein, enables the driver of any type of drag racing vehicle to position that racing vehicle to a consistently accurate, preferred and predetermined "staging" position prior to the starting time of each race, which thereby substantially increases the driver's percentage of winning each race and the resultant competition, and even furthermore, substantially assists the driver in successfully overcoming the difficulties encountered at various racing tracks concerning the aforementioned non-standardization or non-uniform installation of the specific elements of the electronic starting system which govern the start of each racing event.

As the present invention, inclusive of the disclosed methods and apparatus thereof, may be embodied in several forms without departing from the spirit or essential characteristics thereof, the present embodiments are, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. An apparatus for positioning a drag racing vehicle to a preferred "staged" position at the starting-line of a drag racing track, said apparatus comprising:
   (a) means responsive to the movement of the drag racing vehicle for producing a series of pulses, the number of which is indicative of the distance travelled by said drag racing vehicle at the starting-line area of a drag racing track;
   (b) counter means connected in circuit to said means responsive to the movement of the drag racing vehicle for counting said series of pulses;
   (c) decoder/driver means connected in circuit with said counter means;
   (d) digital display readout means connected in circuit to the output of said decoder/driver means; and
   (e) external reset means connected in circuit with said counter means for resetting said counter means to erase the stored count of said series of pulses therein.

2. The method as defined in claim 1 further comprising the step of utilizing the ascertained numerical representation, which is indicative of the forwardmost properly "staged" position of a drag racing vehicle at the starting-line of a drag racing track, to position a drag racing vehicle to the said forwardmost properly "staged" position prior to the start of a drag racing event.

* * * * *